May 24, 1966 G. W. BAUGHMAN 3,253,126
AUTOMATIC TRAIN IDENTIFICATION SYSTEM
Filed June 8, 1961 2 Sheets-Sheet 1

INVENTOR.
George W. Baughman
BY W. L. Stout
HIS ATTORNEY

May 24, 1966  G. W. BAUGHMAN  3,253,126
AUTOMATIC TRAIN IDENTIFICATION SYSTEM
Filed June 8, 1961  2 Sheets-Sheet 2

INVENTOR.
George W. Baughman
BY  W. L. Stout.
HIS ATTORNEY

United States Patent Office 3,253,126
Patented May 24, 1966

3,253,126
AUTOMATIC TRAIN IDENTIFICATION SYSTEM
George W. Baughman, Swissvale, Pa., assignor to Westinghouse Air Brake Company, Wilmerding, Pa., a corporation of Pennsylvania
Filed June 8, 1961, Ser. No. 115,623
4 Claims. (Cl. 235—61.11)

This invention relates to automatic identification systems, and more specifically to a system wherein the identification of a railway vehicle is transmitted to trackside.

In the operation of a railroad it is essential to know the location of trains and of the presence and identification of the various pieces of rolling stock located throughout the railway system. This information is especially important and yet more difficult and expensive to obtain where freight cars are concerned, since their individual movements are relatively diverse and erratic. The task and importance of keeping track of the rolling stock within a railway system is compounded by the presence of thousands of freight cars which belong to other railroads and which are presently entering, using and leaving the rails within the system.

About the most efficient and economical way to account for the movement of all of this rolling stock is by means of a vehicle identification system wherein each vehicle is automatically identified as it passes appropriately located identification check points. However, at present the various pieces of rolling stock within a system are almost invariably visually identified by railroad personnel who, at times with the aid of television equipment, note and record the identification number of each vehicle as it passes a given check point.

Accordingly, it is a principal object of the present invention to provide an automatic system for reproducing information carried by objects moving past a predetermined check point.

In addition to the obvious necessity of keeping track of all of the rolling stock within a system, the identification of individual cars and entire trains is also necessary in order that their movement within the system may be controlled. Since many of these movements are now automatically controlled once the identification of the car or train is determined, it is apparent that an automatic identification system, when tied in with existing automatic control equipment, would be a big step toward a completely automatic railroad operation.

It is another object of the present invention to provide an automatic identification system which can be used to identify individual freight cars and entire trains.

Another object of this invention is to provide an identification system which will enable moving trains and/or cars to automatically transmit their identification to trackside receiving equipment.

A still further object of this invention is the provision of an identification system, the vehicle mounted portion of which is inexpensive to produce and quickly and easily mounted on the vehicle to be identified.

Another object of this invention is to provide an automatic identification system which is capable of cooperating with existing automatic control equipment.

Briefly stated, the identification system of the present invention, which may be employed, by way of example, by a railroad, consists of a plurality of infrared absorption members mounted on the vehicle to be identified and arranged thereon in a coded pattern corresponding to the identity of the vehicle. Appropriately positioned at wayside is a source of infrared energy, for heating the vehicle-carried absorption members, a series of infrared responsive cells, for "reading" the pattern radiated by the infrared absorption members, and storage apparatus to receive the coded information for subsequent use.

Other objects, applications, attributes and advantages of the invention will become apparent as the description proceeds.

The accompanying drawings illustrate, in a simplified and diagrammatic manner, the preferred form and various adaptations or modifications of the invention.

In describing the invention in detail, reference will be made to the accompanying drawings, in which like reference characters designate corresponding parts throughout the several views, and in which.

Figure 1:
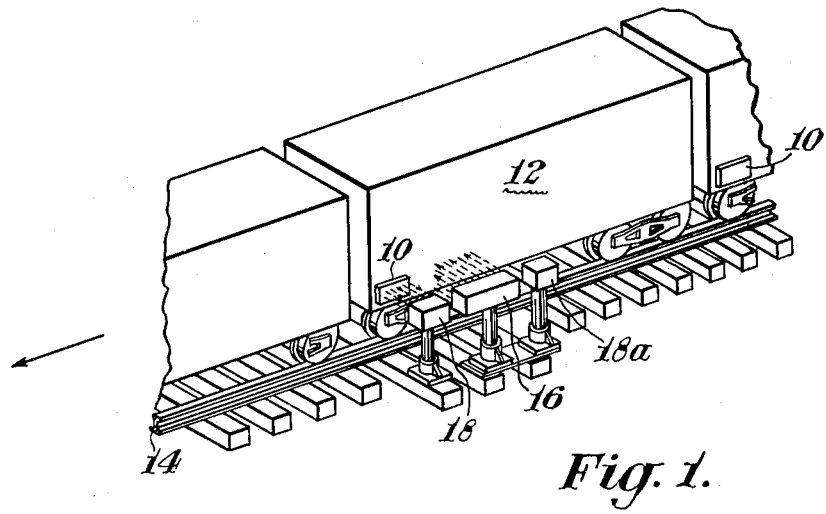
FIG. 1 is a perspective view of a railway vehicle carrying an identification plate formed in accordance with the invention for cooperation with wayside irradiation and detection eqiupment.
Figure 2:
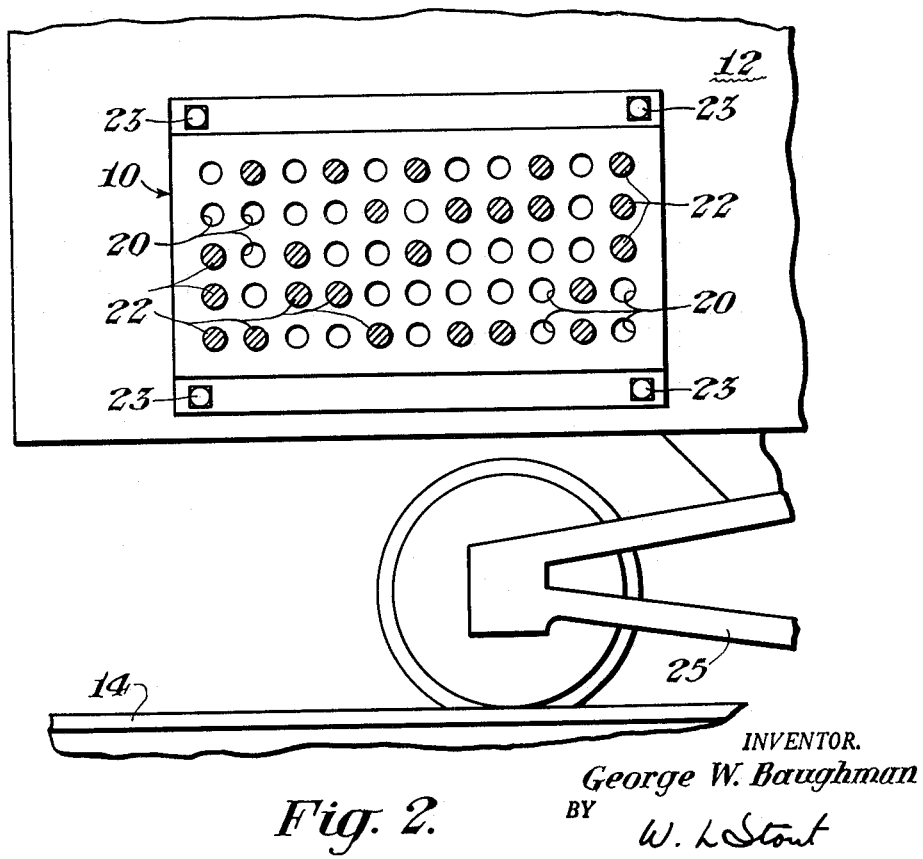
FIG. 2 is a fragmentary view in perspective showing, in detail, a form of the identification plate, embodying the invention, mounted on a portion of a railway vehicle.
Figure 3:
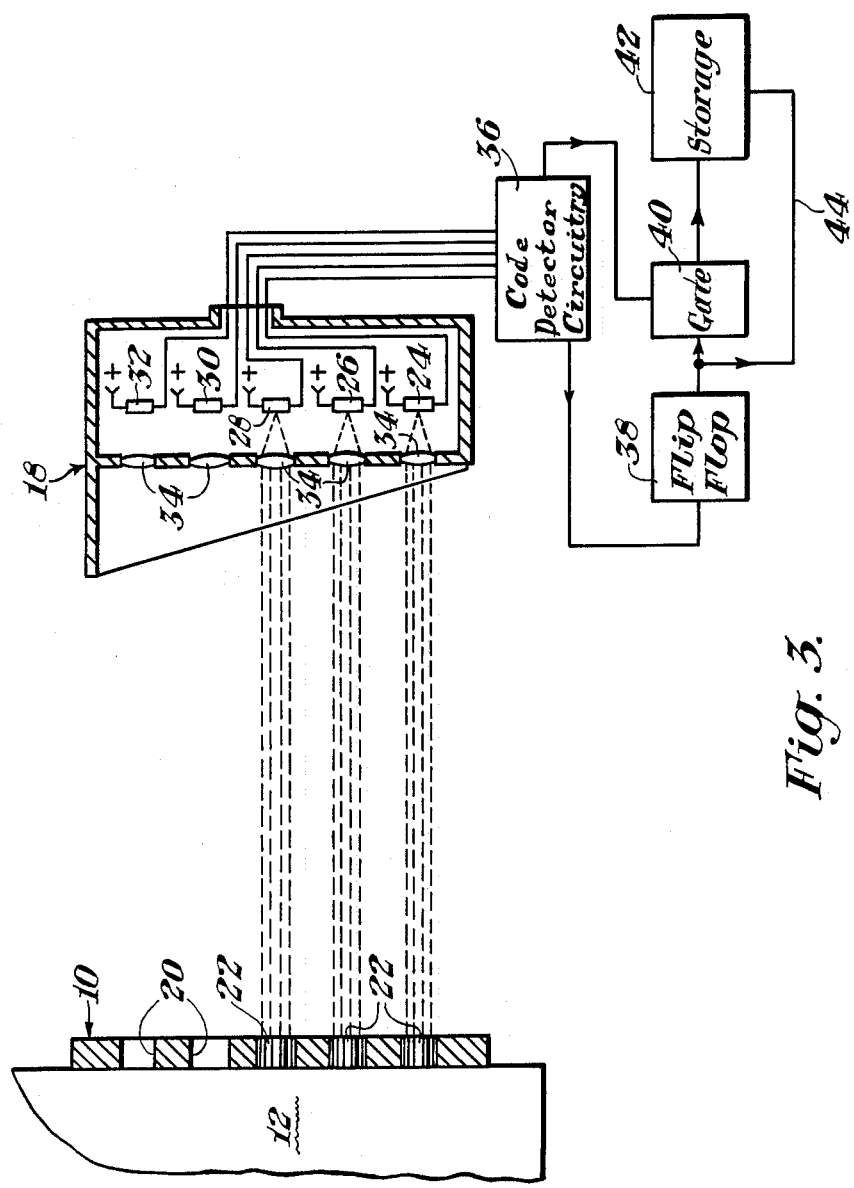
FIG. 3 is a diagrammatic illustration of the detecting and storage portions of applicant's system.

Referring now to FIGS. 1, 2, and 3 of the drawings, the invention is shown in application to the automatic identification of passing railway vehicles and consists of a car-carried identification plate 10 mounted on opposite sides of a conventional railway vehicle, such as a freight car 12, which moves along a section of track 14, past an identification check point where trackway equipment comprising a radiant energy unit, such as a bank of heating lamps 16, and radiant energy sensing devices, such as infrared detectors 18 and 18a, are positioned to respectively heat coded metallic portions in plate 10 and detect the coded infrared radiations transmitted by these metallic portions.

Referring more particularly to FIG. 2, the embodiment of the car-carried identification plate 10 shown is formed from a block of insulation material, such as Bakelite, and has cylindrically shaped depressions 20 molded in one surface thereof and arranged in orderly spaced relation to each other within eleven vertical columns and five horizontal rows. For purposes of descriptively locating and referring to the position of a particular cylindrical depression 20 in plate 10, the columns of cylindrical depressions 20 are assumed to be serially numbered from left to right, with the first column extending vertically along the left side of the plate and the eleventh or last column as extending vertically along the right side of the plate. Also the five horizontal rows of depressions 20 are assumed to be serially numbered from bottom to top, with the first horizontal row extending adjacent the lower edge of plate 10 and the fifth or top row as extending in substantial parallelled adjacency to the upper side or edge of the plate. Thus, for example, the cylindrical depression in the upper left-hand corner of plate 10 can be referred to as located in the first column and in the fifth row.

A code pattern is formed in plate 10 by inserting a cylindrically shaped metallic slug or disc 22 into certain ones of the various cylindrical depressions within the plate in accordance with a predetermined coding arrangement, an example of which is presently described.

For reasons which will presently become clear, cylindrical discs 22 are preferably formed of a metal having a high emissivity rating, such as oxidized copper, and are of such a size as to enable them to be inserted into snug fitting engagement within cylindrical depressions 20.

In order to facilitate the mounting of plate 10 on a portion of car 12, integrally formed flanges are provided along two opposite edges of the plate through which bolts 23 may be inserted to rigidly secure the plate to the car.

Although identity plate 10 is shown secured to a side of the body of car 12, it is to be understood that the plate may be mounted on other portions of the car as well. Thus, for example, to minimize the possibility of erroneous readings, due to the up and down motion of the car at higher speeds, plate 10 may be mounted on a portion of one of the wheel trucks 25, with the wayside equipment appropriately positioned to heat discs 22 in plate 10 and to read out the coded energy pattern transmitted thereby.

At this point it should be noted that two of the significant features directly attributable to the simplicity of construction of car identity plate 10 are that it is very inexpensive to produce and that, in the event it has been damaged or removed from the car, a duplicate plate may be easily made and replaced by a mechanic without the need of special tools.

Turning now to a detailed description of the coded arrangement of discs 22 in plate 10, the disc arrangement, shown in FIG. 2, is designed to perform two distinct, yet related, functions; namely, to control the wayside detecting equipment and to transmit the identity of car 12 to this equipment. The first of these functions, that is the control of wayside detecting equipment, is effected by providing a distinctive disc arrangement in the first and eleventh columns of plate 10 and by further providing appropriate circuitry within the wayside detecting equipment which responds to the effect of this disc arrangement on detector 18 by admitting the identity code, transmitted by plate 10, to storage, in a manner presently described. As illustrated in FIG. 2, one form of a distinctive disc arrangement which will accomplish this control of the wayside equipment consists of three discs 22 positioned in the first and eleventh columns in such a manner that the pattern arrangement in the first column is the inverse of the pattern arrangement in the last column. This arrangement, in addition to controlling the receiving condition of the wayside equipment, also serves to indicate the order in which the code has been read out. As a result the coded disc arrangement in plate 10 may be read out from left to right or right to left without any possible confusion arising as to the order in which the code is to be interpreted.

The disc arrangements in the second through the tenth columns serve to identify car 12. As shown, each of these columns contains two discs which are positioned in various rows within two of the five cylindrical depressions 20 in each column. In accordance with the code table presented below, the row position of discs 22 within any given column yields a digit of the regular base 10 type.

CODE TABLE

| Digit | Horizontal Row Containing Discs (Within any Given Vertical Column Reading From Bottom to Top) |
|---|---|
| 1 | 1st and 2d. |
| 2 | 1st and 3d. |
| 3 | 1st and 4th. |
| 4 | 1st and 5th. |
| 5 | 2d and 3d. |
| 6 | 2d and 4th. |
| 7 | 2d and 5th. |
| 8 | 3d and 4th. |
| 9 | 3d and 5th. |
| 0 | 4th and 5th. |

Now reading out the second through the tenth columns of the disc arrangements in plate 10, as shown in FIG. 2, column by column from left to right, in accordance with the above code table, yields the digital representation of 457393301, which may be an identity in itself or may represent a numeric and alphabetic symbol which identifies the freight car 12 and the railroad to which it belongs. For example, insofar as the latter representation is concerned, the first three digits, 457, could be used to designate the particular railroad and the last six digits, 393301, could identify the actual number of the car of that railroad.

Although the foregoing code has been used to illustrate one possible coding arrangement, since it enjoys a special condition of simplicity and adaptability for machine processing, it is to be understood that a number of other coding systems are adaptable for use in the identification system.

The radiant energy unit, located at an identification point along the trackway, may consist of a bank of heating lamps 16 positioned to focus their heat energy against the surface of plate 10 containing the cylindrically shaped depressions 20 and discs 22. Of course, discs 22 may be heated by other radiant energy apparatus such as by means of eddy current heating from a wayside alternating magnetic field. In any event, the source of heat energy should be capable of raising the temperature of discs 22 to a point above ambient sufficient to provide a signal capable of being detected by the type of wayside radiant energy detector used. Thus, for example, an appropriately positioned wayside detector employing indium antimonide cells will detect infrared signals from discs 22, if the temperature of the discs is raised to approximately 150° F. above ambient.

Each of the wayside detectors 18 and 18a is identical in construction and, as best shown in the sectional view of detector 18 in FIG. 3, each includes a bank of five infrared detector cells 24, 26, 28, 30 and 32 arranged in a vertical column and optics 34, such as silicon lens, to focus the infrared radiation from the rows of discs 22 onto the correspondingly positioned infrared cells. Thus, for example, detectors 18 and 18a are positioned with respect to the car-mounted plate 10 so that the infrared radiations from heated discs 22 in the first horizontal row are, column by column, focused through optics 34, onto cell 24 as car 12 passes by the detector. In the same manner, the infrared radiations from discs 22 located in the second through the fifth rows in plate 10 are focused through optics 34 onto cells 26 through 32, respectively.

In the event it is contemplated that the railroad vehicles to be identified will pass along track 14 in both directions, that is, that they will move from left to right as well as right to left past the identification check point, then it will be necessary to have a detector 18 and 18a positioned on both sides of the bank of heating lamps 16, as shown in FIG. 1. In this way one or the other of detectors 18 and 18a will be actuated, in a manner presently described, by the heated discs 22 in plate 10. Of course, another possible arrangement is that a bank of heating lamps could be located on both sides of detector 18 with detector 18a eliminated, thereby assuring that the discs 22 in plate 10 will be heated when passing the detector regardless of the direction of travel of car 12 along track 14. Finally, it is also obvious that a heating unit 16 and a detector 18 could be located on both sides of track 14 with the units on one side or the other being put into a heating and reading condition by means of a directional wheel trip. However, this last suggested arrangement requires more wayside equipment than the first two arrangements, and is unnecessary since the wayside equipment in this system is capable of operating from one side of the track only to read out the identification information contained in the car-carried identity plate 10, regardless of the direction in which it moves when passing the identification check point.

Turning now to a consideration of the operation of the automatic identity translating system when the car-carried identity plate 10 is passing a wayside identification check point, reference will be made to FIGS. 1, 2 and 3 wherein car 12 is moving in the direction indicated in FIG. 1. As car identity plate 10 passes the bank of heating lamps 16, the metallic discs 22 mounted on the plate are heated and thus placed in a radiating condition.

As car 12 continues to move along track 14 and plate 10 is carried along past detector 18, the infrared radiations from heated discs 22 are focused, column by column, through optics 34 onto correspondingly positioned cells 24 through 32.

In accordance with the indicated direction of movement of car 12, the infrared radiations from the three discs in the first column of plate 10 are the first to influence detector 18 and are focused through optics 34 against the correspondingly positioned lower three cells 24, 26 and 28 of detector 18, thereby causing current to flow through these cells to provide a distinctive output representative of the disc pattern in the first column. This output is then fed into code detector circuitry 36 which has been arranged to respond to this output by changing the condition of a flip-flop 38 from an off to an on condition or vice versa. For reasons which will presently become clear, it is presumed that the coded identity plate of the preceding car caused the code detector circuitry 36 to turn flip-flop 38 to its off condition. Thus code detector circuitry 36 now acts to turn on flip-flop 38 which in turn opens gate 40 to admit the coded pulses from detector 18 into storage 42 as various pairs of infrared detecting cells 26 through 32 are energized by the beams of infrared energy transmitted from the passing columns of discs 22 in plate 10. As the eleventh and last column of discs 22 in plate 10 passes detector 18, the resulting detector output is such as to cause code detector circuitry 36 to change the condition of flip-flop 38, which in this instance is from an on condition to an off condition, thereby closing gate 40 and at the same time preparing storage 42 through line 44 to accept a readout command. At this point the identity signal representing car 12 may be used for any of a number of purposes, ranging from simply keeping track of the movement of the vehicle to routing it automatically through a classification yard or, in the case of an entire train, through an interlocking.

Although the form of the present invention shown and described herein relates to a system for detecting the identity of railway vehicles, it is to be understood that this form is selected to facilitate the disclosure of the invention and is not intended to limit the number of forms which it may assume or the number of applications in which it may be employed. Moreover, it is to be further understood that various modifications, adaptations and alterations may be applied to the specific form shown to meet the requirements of practice, without in any manner departing from the spirit and scope of the present invention.

Having thus described my invention, what I claim is:

1. A system for automatically transmitting the identity of a moving vehicle to wayside comprising in combination, a plate mounted on said vehicle and having portions capable of absorbing infrared energy, said portions having a radiating and a nonradiating condition being arranged to form a pattern corresponding to the identity of said vehicle, a source of infrared energy for placing said portions in a radiating condition, first and second detection means positioned on either side of said source of infrared energy being responsive to the radiating condition of said portions for providing an output corresponding to the pattern radiated by said portions, and means for storing the output of said first and second detection means.

2. An identification system for identifying a railway vehicle moving along a railroad track comprising in combination, a mounting plate formed of insulating material secured to said vehicle and having a plurality of openings therein, a plurality of infrared absorption members having a radiating and a nonradiating condition and mounted within a portion of the openings in said plate to form a code pattern corresponding to the identity of the railway vehicle, a source of infrared energy positioned alongside the track for establishing a radiating condition of said members, first and second detection means positioned alongside a portion of the track and including a series of infrared-responsive cells and optics to respond to the radiating condition of said members, said first detection means being responsive to the radiating condition of said members for providing an output corresponding to the code pattern radiated by said members when the vehicle is moving in one direction along the track and said second detection means being responsive to the radiating condition of said members for providing an output corresponding to the code pattern radiated by said members when the vehicle is moving in the opposite direction along the track, and means for storing the output of said first and second detection means.

3. An automatic identification system for transmitting identity information from a moving railway vehicle to trackside comprising in combination, a plate mounted on a portion of said vehicle and having a plurality of depressions formed in a face of said plate, a plurality of infrared absorption members having a radiating and a nonradiating condition mounted within a portion of said depressions to form a code pattern corresponding to the identity of said vehicle, a source of infrared energy positioned adjacent a trackside check point for placing said members in a radiating condition, first and second radiation detection means positioned on either side of said source of infrared energy and each of said first and second detection means responsive to the radiating condition of said members dependent upon the direction of said vehicle movement for providing an output corresponding to the code pattern radiated by said members, code detector circuitry electrically interconnecting said first and second detection means and energized by the output of said first and second detection means dependent upon the direction of vehicle movement, a storage device and a gating means electrically interconnected, said gating means electrically connected to said code detector circuitry and actuated to a gate open position only when said code detector circuitry is energized for admitting the output of each of said first and second detection means which corresponds to the identity code pattern into said storage device.

4. A system for automatically transmitting identification information from a moving railway vehicle to wayside comprising in combination, a plate formed of an insulating material mounted on a portion of said vehicle, a plurality of metallic members having a radiating and a nonradiating condition and arranged on said plate to form first and second control patterns and an identity pattern corresponding to the identity of said vehicle, said identity pattern being formed on said plate intermediate said first and second control patterns, a source of radiant energy positioned at a wayside check point and arranged to place said members in a radiating condition, a pair of detection means positioned adjacent said source of radiant energy, one of the pair of detection means being responsive to the radiating condition of said members for providing outputs corresponding to the pattern arrangements of said radiating members when said vehicle is moving in a first direction past the wayside check point and the other of the pair of detecting means being responsive to the radiant condition of said members for providing outputs corresponding to the pattern arrangements of said radiating members when said vehicle is moving in a second direction past the wayside check point, a code detector circuitry energized by the output of said pair of detection means dependent upon the direction of vehicle movement which corresponds to the radiating condition of said first control pattern and deenergized by the output of said pair of detection means dependent upon the direction of vehicle movement which corresponds to the radiating condition of said second control pattern, a storage device and a gating means, said gating means electrically connected to said code detector circuitry and said storage means electrically connected to said gating means, said gating means actuated to a gate open position only when said code detector circuitry is energized for admitting the output of one of the pair of the detection means dependent upon the direction of vehicle movement which corresponds to said identity pattern into said storage device.

References Cited by the Examiner

UNITED STATES PATENTS 2,742,631  4/1961  Rajchman _____ 250—83.3

FOREIGN PATENTS 800,190  8/1958  Great Britain.

MALCOLM A. MORRISON, *Primary Examiner.*

LEO QUACKENBUSH, *Examiner.*

S. T. KRAWCZEWICZ, P. J. HIRSCHKOP, D. W. COOK, *Assistant Examiners.*